(12) United States Patent
Barnett et al.

(10) Patent No.: US 9,645,410 B2
(45) Date of Patent: May 9, 2017

(54) FOLDABLE GLASSES WITH MAGNIFIER

(71) Applicants: Cheryl Barnett, New City, NY (US);
Denise Feldman, Montvale, NJ (US);
Craig Stucko, Commack, NY (US)

(72) Inventors: Cheryl Barnett, New City, NY (US);
Denise Feldman, Montvale, NJ (US);
Craig Stucko, Commack, NY (US)

(73) Assignees: Cheryl Barnett, New City, NY (US);
Denise Feldman, Montvale, NJ (US)

( * ) Notice: Subject to any disclaimer, the term of this patent is extended or adjusted under 35 U.S.C. 154(b) by 0 days.

(21) Appl. No.: 14/451,728

(22) Filed: Aug. 5, 2014

(65) Prior Publication Data

US 2015/0042947 A1    Feb. 12, 2015

Related U.S. Application Data

(60) Provisional application No. 61/862,778, filed on Aug. 6, 2013.

(51) Int. Cl.
*G02C 5/08* (2006.01)
*G02C 5/20* (2006.01)
*G02C 5/00* (2006.01)

(52) U.S. Cl.
CPC .............. *G02C 5/006* (2013.01); *G02C 5/08* (2013.01); *G02C 5/20* (2013.01); *G02C 2200/02* (2013.01)

(58) Field of Classification Search
CPC ........ G02C 5/006; G02C 5/08; G02C 5/2263; G02C 5/20; G02C 5/143
USPC .......................................................... 351/63
See application file for complete search history.

(56) References Cited

U.S. PATENT DOCUMENTS

| | | | |
|---|---|---|---|
| 1,970,044 A | | 8/1934 | Klein |
| 2,766,657 A | * | 10/1956 | Nathan ................. A42B 1/247 |
| | | | 351/111 |
| 5,000,204 A | | 3/1991 | Smith |
| 5,208,616 A | | 5/1993 | Chang |
| 5,366,072 A | | 11/1994 | Goldenberg |
| 5,448,317 A | | 9/1995 | Huang |
| 5,896,185 A | | 4/1999 | Huang |
| 5,929,966 A | | 7/1999 | Conner |
| 6,048,062 A | | 4/2000 | Chow |

(Continued)

FOREIGN PATENT DOCUMENTS

| | | |
|---|---|---|
| CN | 201725093 U | 1/2011 |
| GB | 2477467 A * | 8/2011 |

(Continued)

*Primary Examiner* — Bumsuk Won
*Assistant Examiner* — Henry Duong
(74) *Attorney, Agent, or Firm* — Gearhart Law LLC

(57) ABSTRACT

A pair of foldable eyeglasses may have a number of hinged connections allowing for the folding of the individual components in a number of ways. The eyeglasses may also be folded into a magnifier. The eyeglasses may also be folded up entirely for transport or storage purposes. The eyeglasses have lenses with a frame and temple pieces extending from the frame. When folded, the eyeglasses take advantage of connectors on each the outer edge of the frame and the outer edge of the temple pieces. These connectors permit the eyeglasses to be folded into the magnifier form, as well as provide stability and protection when folded. In other embodiments, magnets or similar connection mechanisms are used to hold the eyeglasses in a storage or magnifying position(s).

5 Claims, 13 Drawing Sheets

(56) References Cited

U.S. PATENT DOCUMENTS

| | | | |
|---|---|---|---|
| 6,409,335 B1 | 6/2002 | Lipawsky | |
| 6,729,722 B1 | 5/2004 | Park | |
| 6,752,496 B2 | 6/2004 | Conner | |
| 6,783,236 B2 | 8/2004 | Chou | |
| 7,198,366 B2 | 4/2007 | Gao | |
| 7,314,278 B2 * | 1/2008 | Resler | G02C 3/003 351/121 |
| 7,455,402 B2 | 11/2008 | Gerber et al. | |
| 7,637,610 B2 | 12/2009 | Graffia | |
| 7,905,591 B2 * | 3/2011 | Strobel | G02C 5/006 351/119 |
| 8,142,013 B2 | 3/2012 | Chang | |
| 8,192,017 B2 | 6/2012 | Chen | |
| 8,317,317 B2 | 11/2012 | Pulvino et al. | |
| 2008/0036962 A1 | 2/2008 | Alitowski | |
| 2010/0073625 A1 | 3/2010 | Engstrom | |
| 2010/0073626 A1 | 3/2010 | Engstrom | |
| 2011/0096288 A1 * | 4/2011 | LaGace | G02C 5/008 351/153 |
| 2011/0228210 A1 | 9/2011 | Willett | |
| 2014/0368784 A1 * | 12/2014 | Rubin | 351/63 |

FOREIGN PATENT DOCUMENTS

| | | |
|---|---|---|
| JP | 2000180798 A | 6/2000 |
| JP | 2002182163 A | 6/2002 |
| JP | 2008298909 A | 12/2008 |
| WO | 99/01348 A2 | 1/1999 |
| WO | 01/40847 A1 | 6/2001 |

\* cited by examiner

FOLDABLE GLASSES WITH MAGNIFIER

CLAIM OF PRIORITY

This application claims the priority of U.S. Application Ser. No. 61/862,778 filed on Aug. 6, 2013, the contents of which are fully incorporated herein by reference.

FIELD OF THE INVENTION

The field of the invention and its embodiments relates to optical devices namely eyeglasses. In particular, to foldable eye glasses that can be conveniently stored and coupled to a secondary object such as a keychain. Further, the eyeglasses can double as a hand held magnifier.

BACKGROUND OF THE INVENTION

There are written accounts of using glass for magnifying purposes dating back thousands of years. However, it was not until the end of the late $13^{th}$ century that the first pair of eyeglasses were have purported to be constructed in Europe. Since then, eyeglasses have become more than a way to correct vision, as they are widely used in fashion and take many forms including safety glasses and sunglasses.

Modern eyeglasses typically have two lenses supported by a frame. The lenses can be a variety of different materials depending on the intended use. These may include glasses or plastics. The frames may be any combination of metal, plastic, wood, stone, shell, horn, and the like. The frame has a bridge connecting the two lenses with pads to comfort and protect the user. The frame also usually has two temple arms extending from each side of the glasses. The temple arms fit over the ears of the wearer and help to prevent the glasses from falling off or shifting during wear.

One issue glasses wearers' face is the inconvenient storage/transportation of their glasses, as not everybody wears their glasses constantly. Many people only need their glasses for a specific function (i.e. reading). Thus, they need to keep their glasses safely stowed away when not in use. Many will use a case that can be soft or hard in order to help protect the glasses. This means the case must remain with the person at all times, or they won't have a place to keep their glasses. Additionally, the cases take up space which can be conserved for other items.

Another issue is the limited functionality of the glasses. They assist in helping individuals see the world around them more clearly, but perform only that one intended function. It is desirable to have glasses that can prove useful in more than one function thereby limiting the need for carrying other alternatives.

Review of Related Technology:

U.S. Pat. No. 7,905,591 pertains to an overall apparatus assembly that provides folding reading glasses, survival series wherein the glasses fold into a jewelry shape hung from a necklace. The overall apparatus assembly further provides a hinged nose portion that allows the eyeglass lenses to fold inward in a quick snap action about the hinged nose. The temples also fold inward and serve as the encase thus protecting the lenses rotating about a second quick action hinge. The spring loaded hinges will provide for cam action to lock the glasses in either an open or closed position. The closed position will further protect the eyeglass lenses and provide a decorative jewelry shaped integral encasement to store the eyeglass apparatus and protect the lenses.

U.S. Pat. No. 7,637,610 pertains to folding eyeglasses with a multifunction carrying case. The folding eyeglasses maybe any type of glasses such as reading glasses, sun glasses, and/or prescription glasses. Preferably, the glasses fold at the bridge of the nose and on each temple. Once folded, the glasses may be placed inside the multifunction carrying case. The carrying case includes a retractable pen and/or a light. The pen may be exposed and/or retracted in any suitable manner. For example, the pen may be spring-loaded and a button may be pushed to expose the pen. In such an instance, the pen may be retracted by pushing it back into the carrying case, thereby resetting the spring. The light may use any suitable light source. For example, the light may use one or more white and/or colored light emitting diodes.

U.S. Pat. No. 5,929,966 pertains to foldable glasses having telescoping temples and central pivoting bridge. The temples are shown with three or four telescoping elements. The four element temple has a distal element that is preformed from material that has a memory which when extended curves around the ear of the user and when the elements are telescoped together can be straightened for inserting in the adjacent straight telescopic element. Two bridge pivoting embodiments are shown, one has an angled pivot pin and the other has a spring biased pivotal section wherein the adjacent pivotal elements are vertically and horizontally translatable against the spring bias when the frame elements are folded for non-use.

Thus, there needs to be a device that is easily storable and compact along with having a multipurpose functionality. The current invention addresses and exceeds these needs by providing a pair of eyeglasses that can be folded for storage or to serve as a hand held magnifier. In turn, various devices are known in the art, however, their structure and means of operation are substantially different from the present disclosure. The eyeglasses cannot be folded to serve as a hand held magnifier, and their structure therefore differs from that of the current invention. As such, the other inventions fail to solve all the problems taught by the present disclosure. At least one embodiment of this invention is presented in the drawings below and will be described in more detail herein.

SUMMARY OF THE PREFERRED EMBODIMENTS

A pair of foldable glasses is described and taught having two lenses with a first side and a second side the first side facing outwards and the second side facing the wearer; a hinged connection for coupling the lenses together and permitting the lenses to fold together either forwards or rearwards; two temple pieces extending from an outer edge of the lenses with a hinged connection between each of the temple pieces and the outer edge of the lenses enabling the two temple pieces to fold inwards or forwards, wherein the two temples pieces have a hinged joint permitting a rear section of the temple pieces to fold forwards underneath the temple pieces; and a connection means on the outer edge of the lenses wherein the connection means has complimentary male and female connectors.

The pair of foldable glasses of this disclosure may also have a connection means on an outer side of each of the two temple pieces, wherein the outer side faces away from the wearer and the connection means have complimentary male and female connectors. These connection means are protruding structures that have two flat portions with two substantially circular portions at the terminal end of the flat portions. When the temple pieces are folded forwards, the connection means are brought together forming a handle. Similarly, the connection between the lenses (bridge) folds bringing the lenses together forms a magnifier. The lenses are stabilized by the connectors on the outer edge of the lenses. These connectors are a group of raised and recessed surfaces wherein the surfaces are arranged in a 2×2 configuration with one raised and one recessed surface in each row and column. This locks the lenses in place preventing slippage or uneven stresses from damaging the eyeglasses.

In another embodiment of the present invention there is a pair of foldable eyeglasses having two lenses having a first side and a second side, the first side facing outwards away from a user and the second side facing inwards towards the user; a hinged bridge for rotatably coupling the two lenses together and permitting the lenses to fold together either forwards or rearwards, wherein the hinged bridge has a stabilizing loop extending therefrom; and two temple pieces extending from an outer edge of the lenses with a hinged connection between each of the temple pieces and the outer edge of the lenses enabling the two temple pieces to fold inwards or forwards, wherein the two temple pieces have a hinged joint permitting a rear section of the temple pieces to fold forwards underneath the temple pieces. The stabilizing loop provides stabilization as well as a structure for the coupling of the foldable glasses to a secondary object such as a keychain, keychain connector, or any combination thereof.

It is an object of the present invention to provide easily foldable eyeglasses.

It is an object of the present invention to provide a compact pair of reading glasses.

It is an object of the present invention to provide a pair of eyeglasses that can be used as a hand held magnifier.

It is another object of the present invention to provide a pair of eyeglasses that fold and protect the lenses.

It is an object of the present invention to provide a pair of eyeglasses that have connections means that provide for a rigid structure when folded.

It is an object of the present invention to provide a pair of eyeglasses that can be coupled to a secondary object such as a keychain.

It is an object of the present invention to provide a pair of eyeglasses that are durable and lightweight.

DETAILED DESCRIPTION OF THE DRAWINGS

Figure 1:
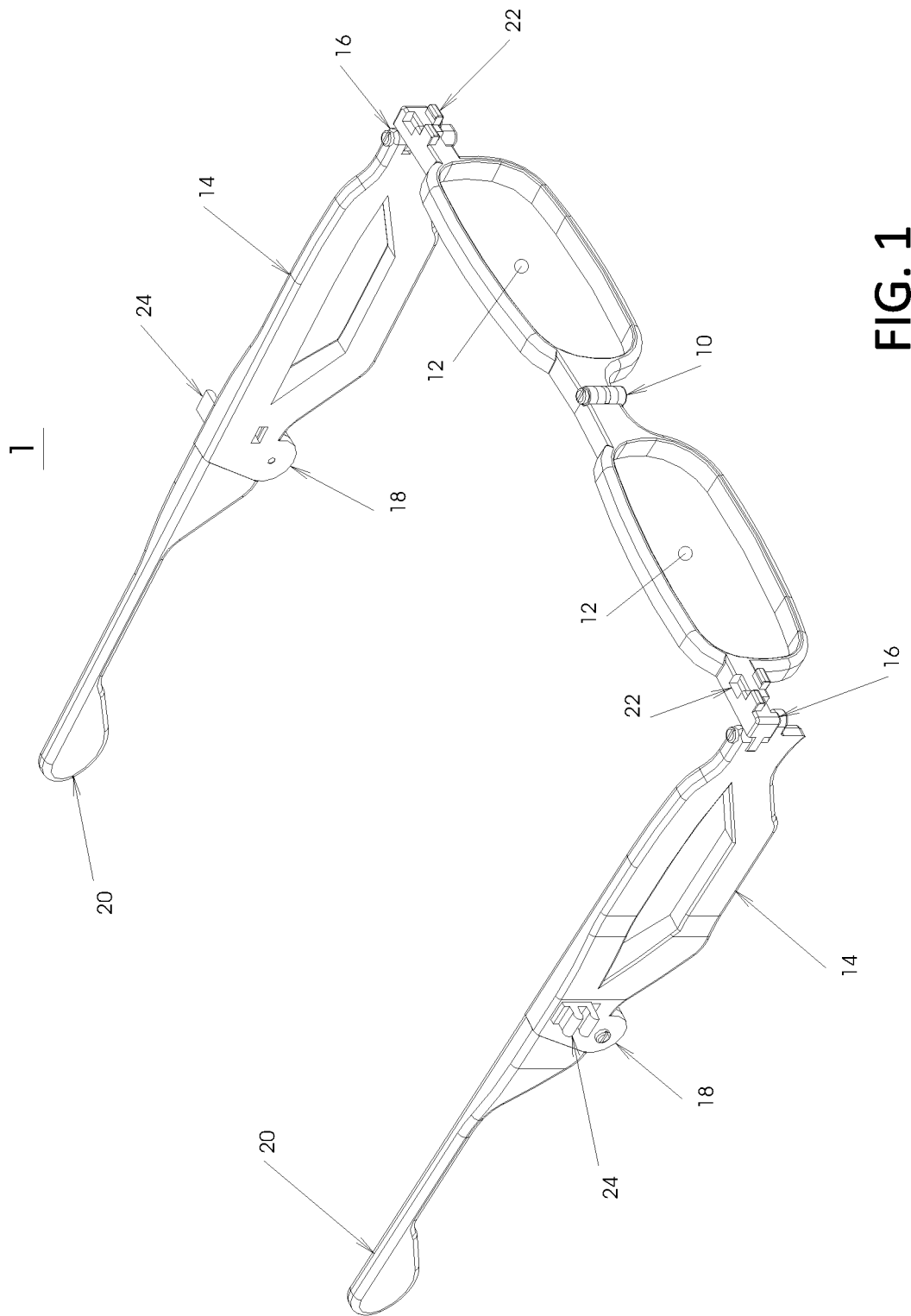
FIG. 1 is a perspective view of an embodiment of the present invention unfolded and ready for wear as eyeglasses.

The preferred embodiments of the present invention will now be described with reference to the drawings. Identical elements in the various figures are identified, as far as possible, with the same reference numerals.

Reference will now be made in detail to embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto without deviating from the innovative concepts of the invention.

Referring to the drawings, FIG. 1 shows the eyeglasses 1 as intended for wearing. The eyeglasses 1 have a pair of lenses 12 held together by a hinged bridge 10. The composition of the lenses 12 may be glass or a polymer. Types of glass lenses may be but are not limited to ground glass. Polymer lenses may be but are not limited to polycarbonates, polyurethanes, polyolefins, and the like. Additionally, other plastics such as Trivex® and high index plastics may be used. The lenses 12 may be polarized or photochromic or both. The hinged bridge 10 forming the bridge is preferably a threaded area with a screw or hinge pin inserted therein. The hinged bridge 10 permits for at least about 90° of motion for the lenses 12. This enables the lenses 12 to be brought together placing them side-by-side.

There is another similar connection between the lenses 12 and the temple pieces 14. Between the two is a hinged connection 16 with one connection being on each side of the eyeglasses 1. This hinged connection 16 is preferably a threaded area with a hinge pin or screw inserted therein. The temple pieces 14 can move either inwards toward the lenses 12 and placing them parallel to the lenses 12 or forwards and placing them in the same plane as the lenses 12. Thus, the hinged connection 16 gives the temple pieces 14 at least about 180° of motion.

The temple pieces 14 have at least a couple different features. Each of the two temple pieces 14 has a rear section 20 that is hingedly connected to the remainder of the temple piece 14. The hinged joint 18 permits forward movement of the rear section 20 of the temple piece 14. The hinged joint 18 has a screw or hinge pin connecting the rear section 20 to the remainder of the temple piece. The rear section 20 can move forwards for storage and transport or to provide a shorter handle for the magnifier application. The temple piece 14 may provide a complimentary shape to the rear section 20. This enables the rear section 20 to be folded up underneath the remainder of the temple piece forming a uniform and easy to hold structure (see FIGS. 2, 3). Additionally, each of the temple pieces 14 has a connection means 24 on the outer edge of the temple piece 14. The outer edge is defined as the edge that faces away from the wearer, whereas the inner edge faces the wearer. The connection means 24 on each temple piece 14 are complimentary and snap into place when brought together. The temple pieces 14 and framing surrounding the lenses 12 including the hinged bridge 10 and hinged connection 16 are preferably a durable plastic. The frames may be any combination of metal, plastic, wood, stone, shell, horn, and the like.

Figure 2:
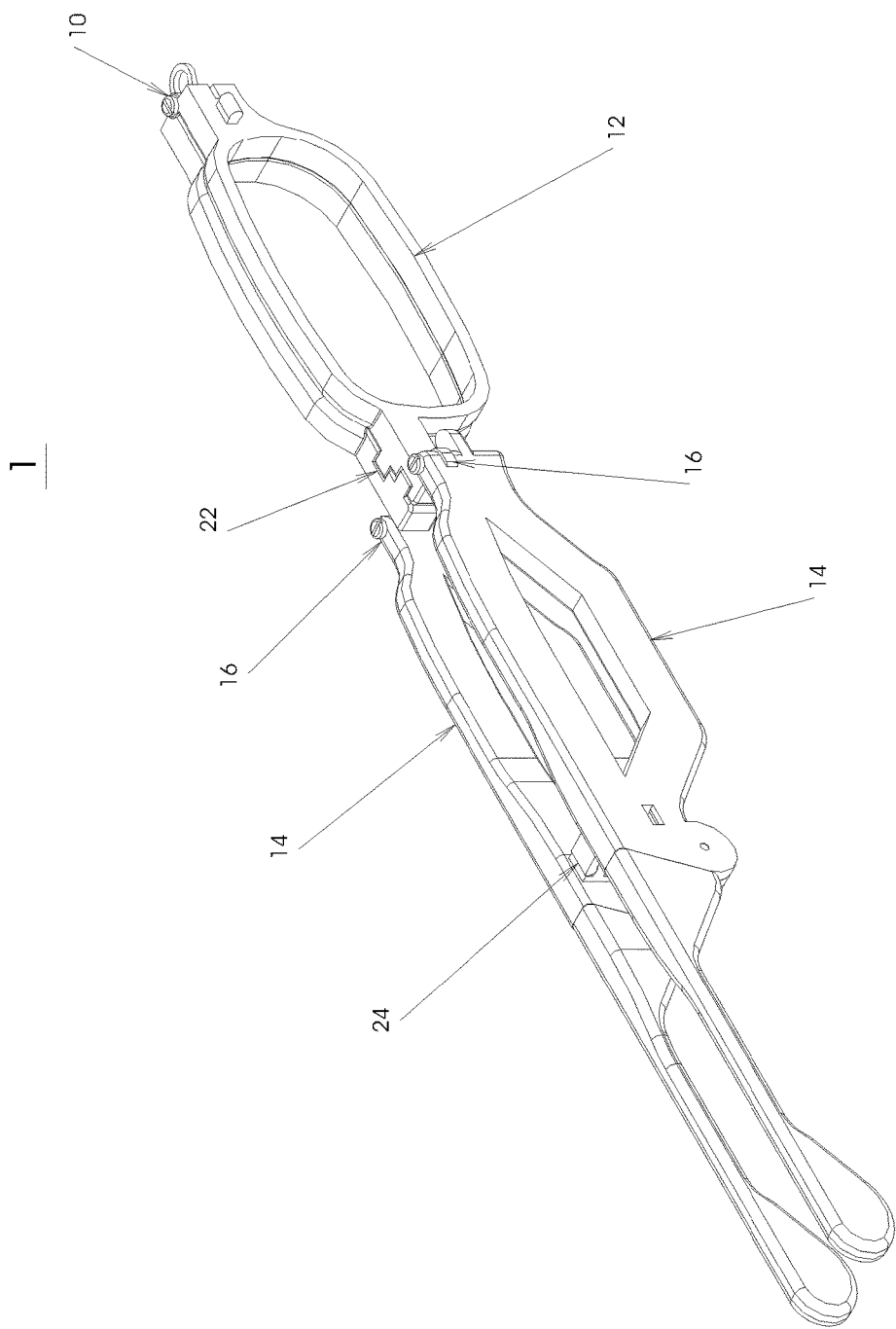
FIG. 2 is a perspective view of an embodiment of the present invention partially folded and ready for use as a magnifier with the temple pieces extended.
Figure 3:
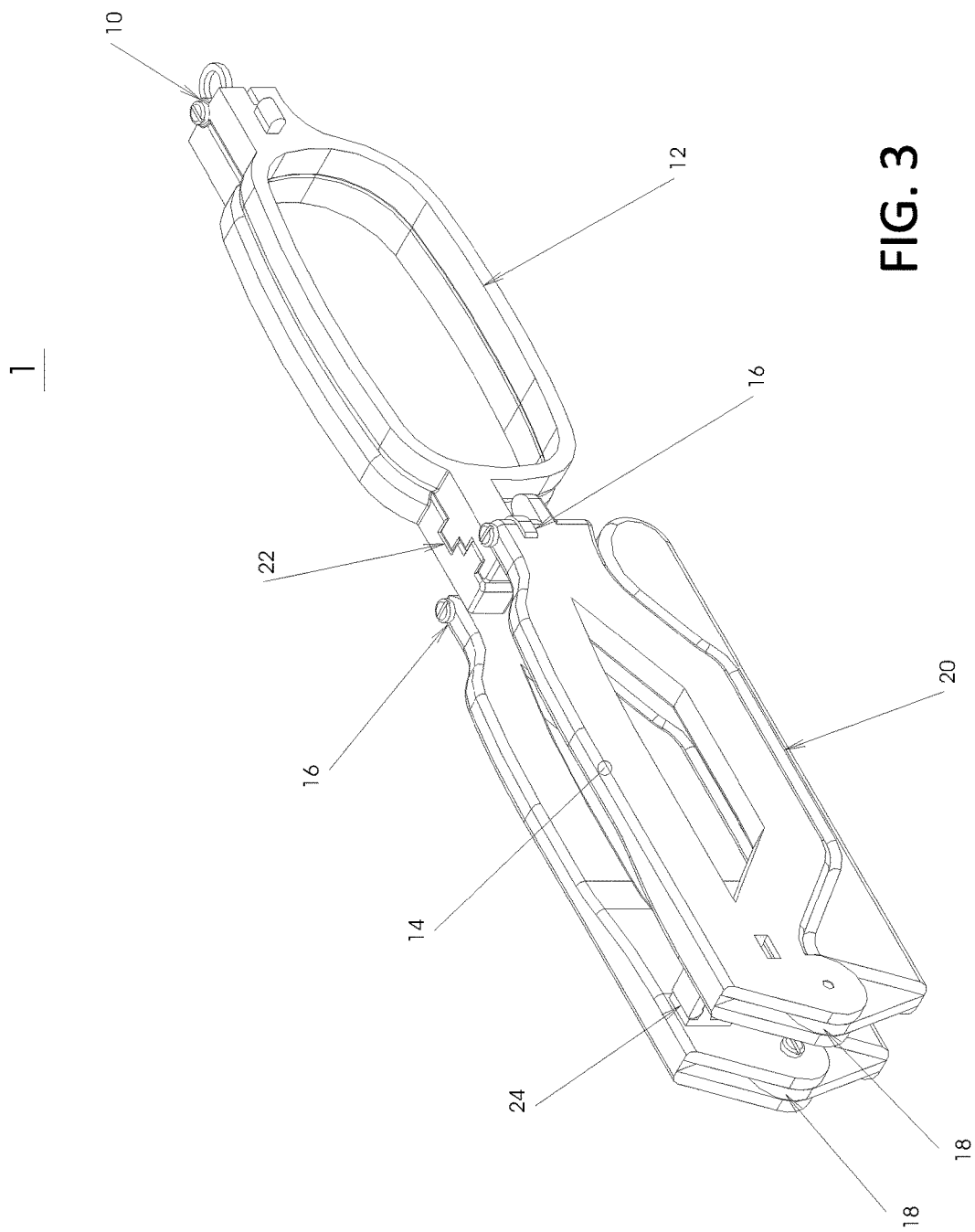
FIG. 3 is a perspective view of an embodiment of the present invention of the magnifier form with the temple pieces folded.

In FIG. 2, the eyeglasses 1 are shown in an alternate folding configuration. This particular configuration allows the eyeglasses 1 to function as a hand held magnifier. The lenses 12 are folded outward from how a user would typically wear the eyeglasses 1. The lenses 12 are brought together around the hinged bridge 10 and secured in place by a connection means on the outer edge of the lenses 22 (see FIGS. 6 & 7). The connection means 22 assures proper alignment of the lenses 12 and prevents uneven stresses from misaligning the lenses 12 or breakage. The temple pieces 14 can then be folded outwards around the hinged connection 16 between the temple pieces 14 and the lenses 12. The temple pieces 14 are brought together and joined by the connection means 24 disposed on the outer surface of the temple pieces 14. This makes the "handle" rigid and provides for a more efficient secondary magnifying function. If a shorter "handle" is desired, the rear sections 20 can be folded up under the temple pieces 14 (see FIG. 3).

The magnification of the eyeglasses 1 can vary depending on the magnification (for reading purposes) of each of the lenses 12 or the prescription of the lenses 12. The magnification is generally calculated and achieved using basic physics principles upon placing the lenses 12 within a narrow or potentially negligible distance to one another with a simplified overall calculation of magnification as:

Magnification=Image Size/Object Size

Thus, enabling the two lenses 12 to combine to provide a greater magnification than either lens 12 individually.

Figure 4:
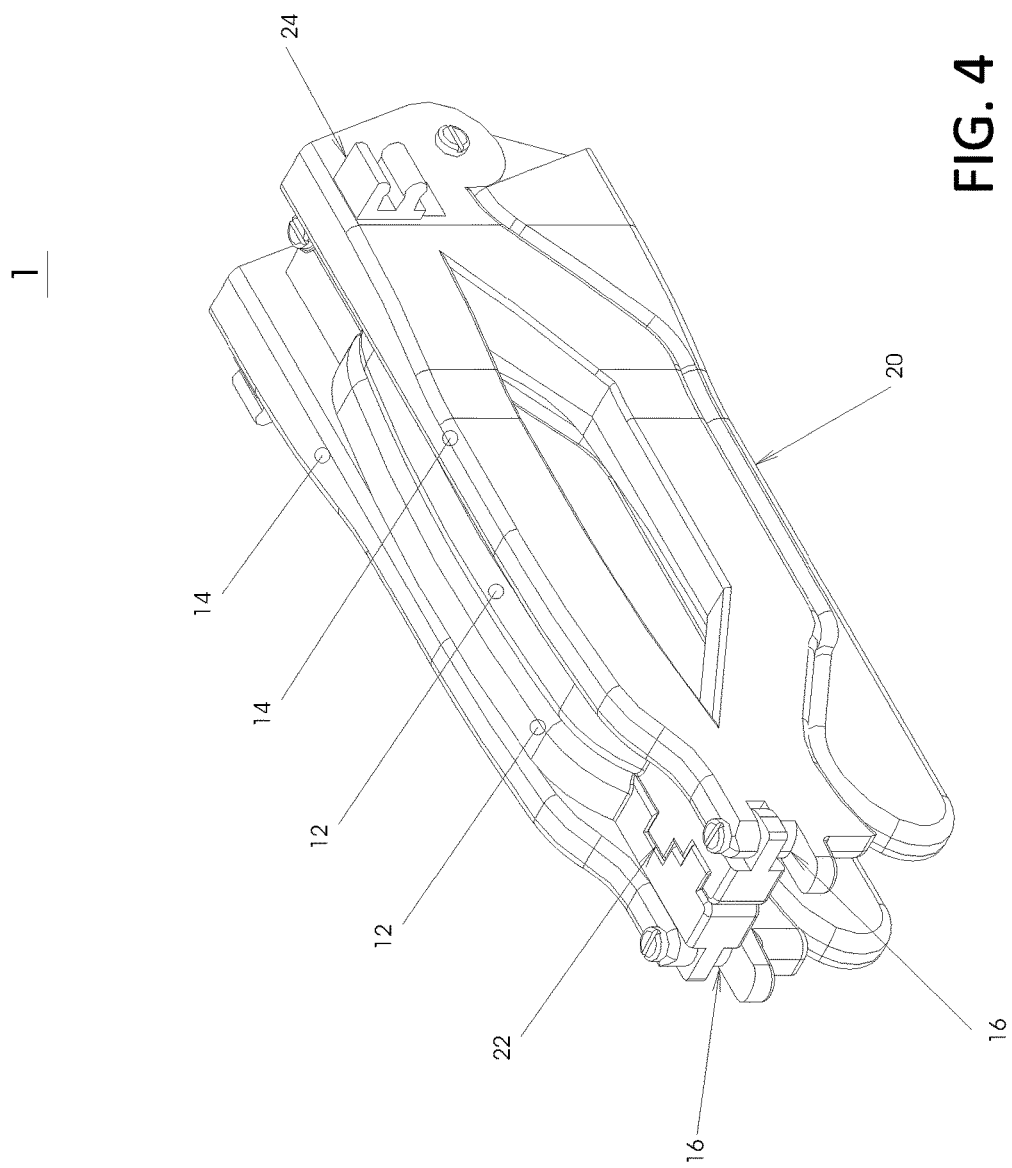
FIG. 4 is a perspective view of an embodiment of the present invention fully compact and ready for transport or storage.

FIG. 4 demonstrates yet another folding configuration for the eyeglasses 1. Here, the eyeglasses 1 are folded and ready for storage or transport. The lenses 12 are folded together outward around the hinged bridge 10 and secured in place by a connection means on the outer edge of the lenses 22. The temple pieces 14 are folded down and besides the lenses 12 providing a more compact device and protection for the lenses 12. The rear sections 20 are folded underneath the temple pieces 14 completing the storage/transport configuration. In this configuration, the eyeglasses 1 are in the most compact configuration available. This enables them to be stored/transported in a number of ways. The eyeglasses 1 would fit easily into a shirt pocket or pants pocket. The eyeglasses 1 may be adaptable to be hung on or from another object. Thus, the eyeglasses 1 may be strung on a necklace or bracelet and worn from there. Additionally, the eyeglasses 1 may be kept on a keychain. In some embodiments, the eyeglasses 1 may have a loop or similar coupling structure to permit the eyeglasses 1 to be joined with the aforementioned objects. Here, the keychain or similar device may attach to the stabilizing loop 11 that is part of the hinged bridge 10 (see FIGS. 2, 3). Alternatively, another part of the existing structure of the eyeglasses 1 may be suitable for attachment of an elongated chain or keychain coupling. In order for the eyeglasses 1 to function properly they may need to be removed from the chain or keychain before wearing. However, the attachment may be done in such a way that when a user decides to wear the eyeglasses 1 they are simply unfolded and placed on the user.

Figure 5:
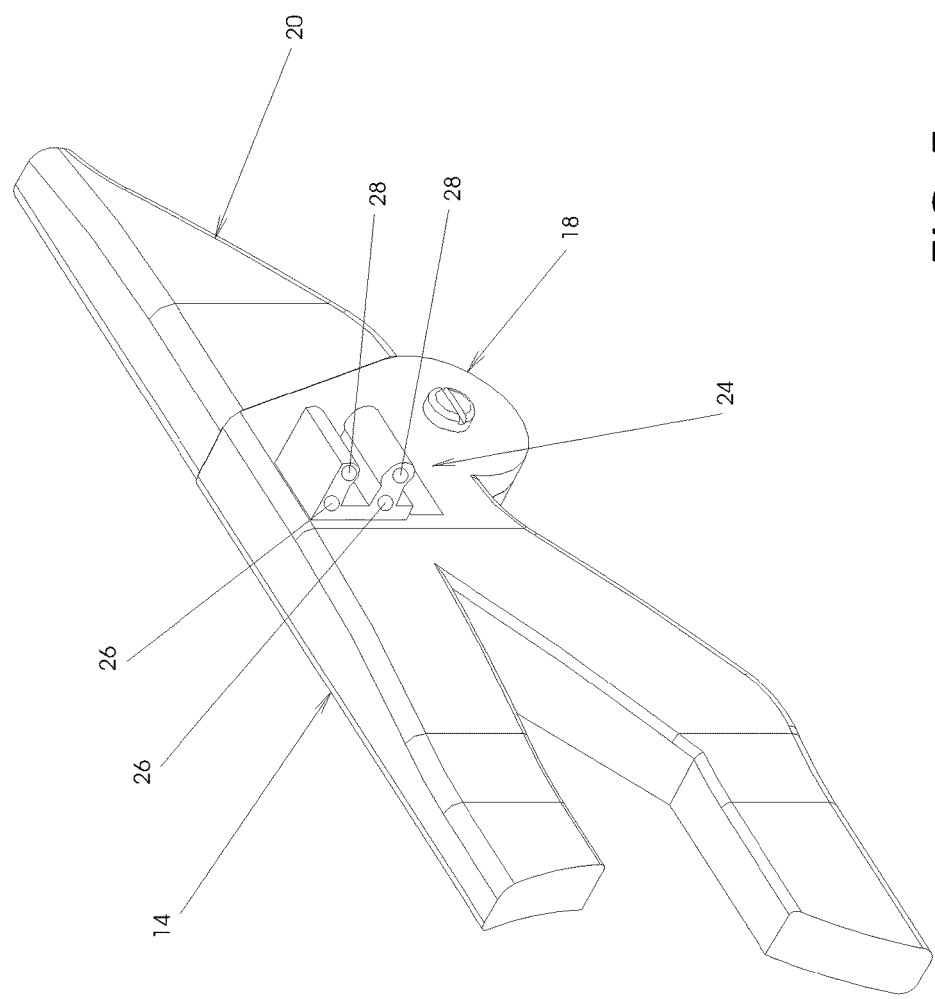
FIG. 5 is a close up of the joint on the temple piece and the connector on the temple piece.
Figure 8:
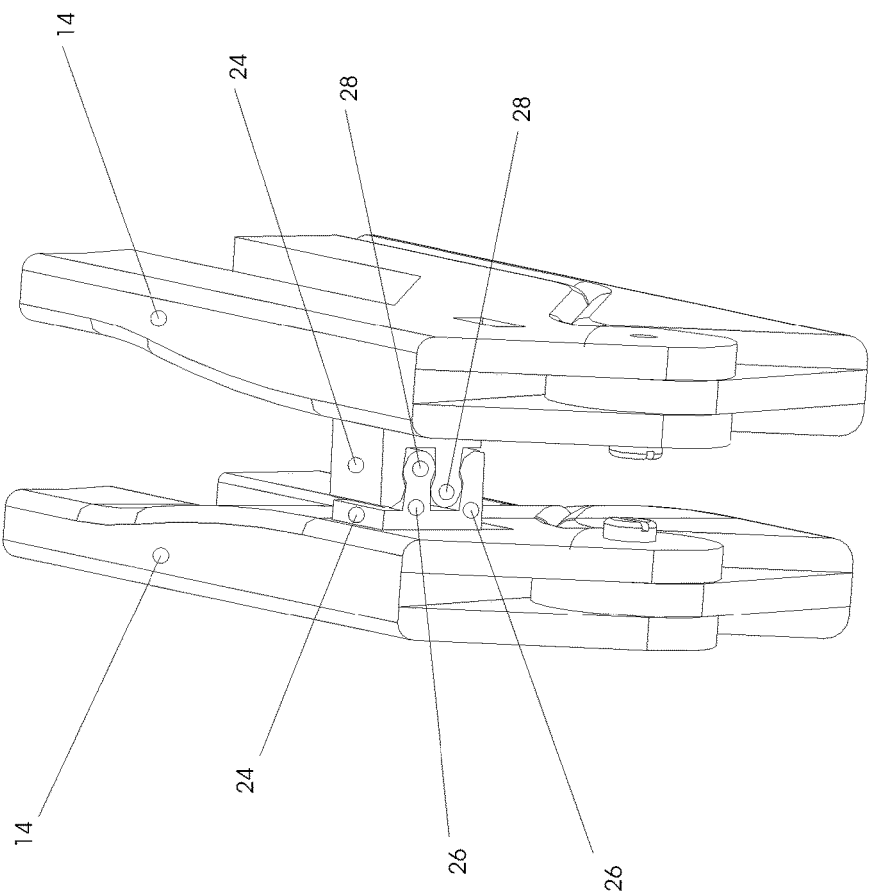
FIG. 8 is a close up of the connector on the outer edge of the temple pieces when folded together.

In FIG. 5, there is a close up view of the outer edge of one temple piece 14 showing the hinged joint 18 and connection means 24 disposed thereon. The connection means 24 is preferably an interlocking connector but any connection apparatus can be employed. The connection means 24 has at least two flat surfaces 26 extending from and perpendicular to the temple pieces 14. Each of the at least two flat surfaces 26 has a substantially circular formation 28 on the terminal end. The connection means 24 on each of the temple pieces 14 are offset in such a way that the circular formation 28 of one of the connection means 24 fits into the void created by the at least two flat surfaces 26 of the other connection means 24 (see FIG. 8). Each side snaps into or is otherwise held by the other holding it in place. This is used for stabilization when the eyeglasses 1 are folded into the hand held magnifier configuration. These connection means 24 are on the outside of the eyeglasses 1 and opposite each other when being stored or transported.

Figure 6:
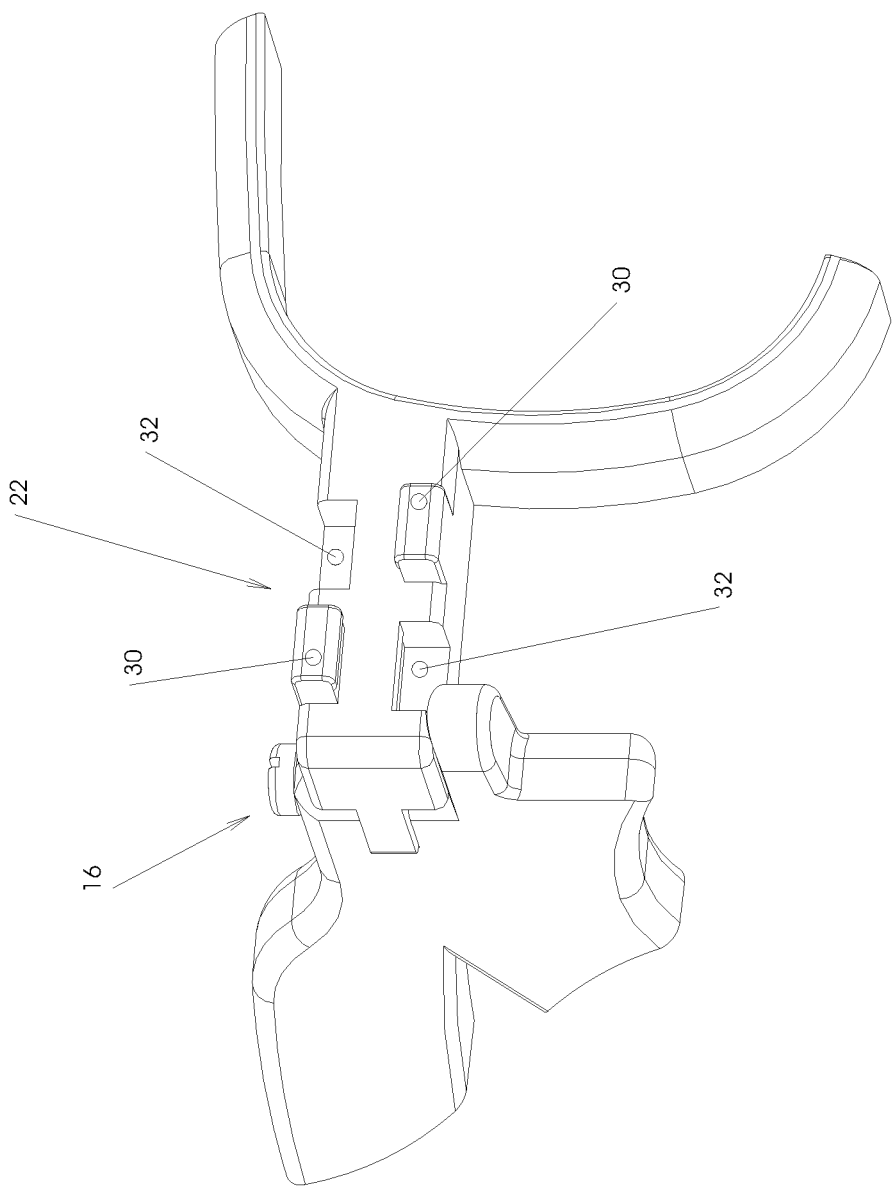
FIG. 6 is a close up of the connector on the outer edge of the lenses.
Figure 7:
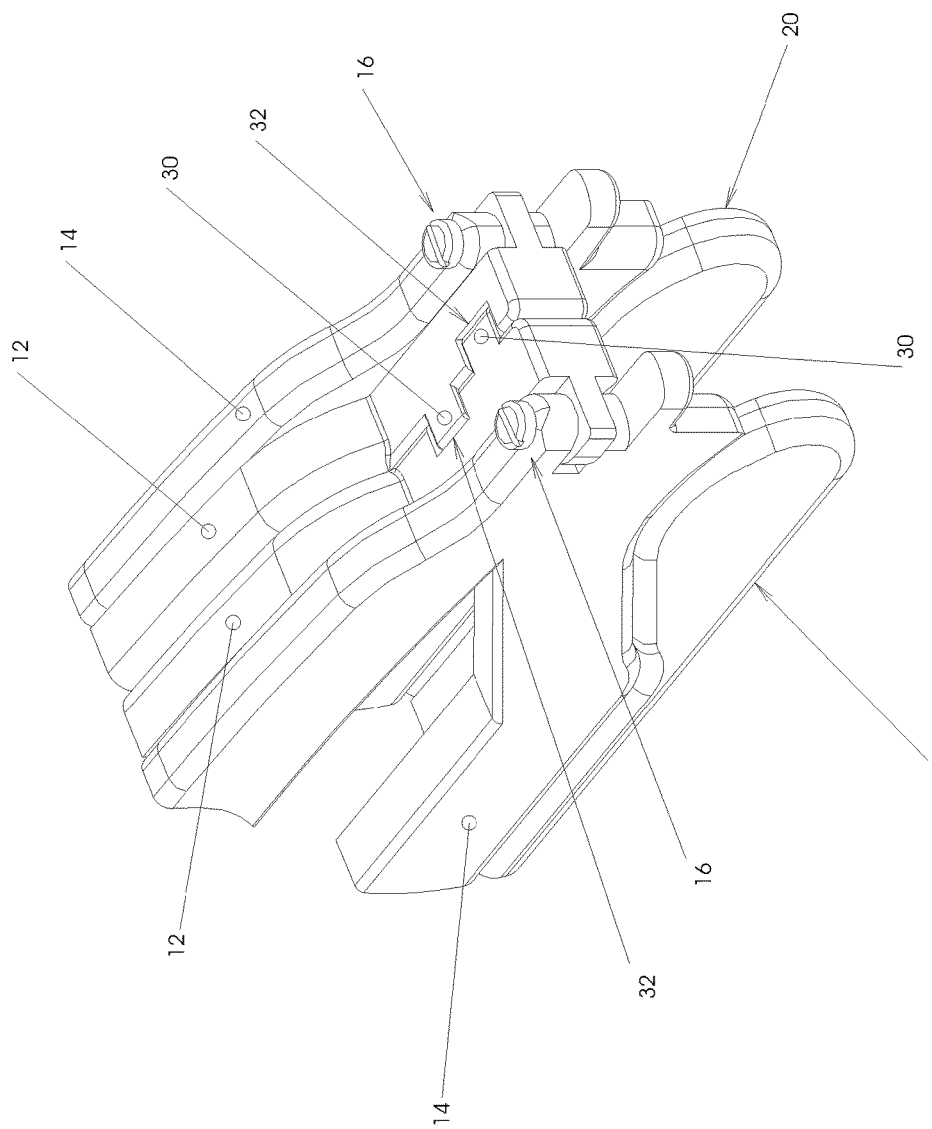
FIG. 7 is a close up of the connector on the outer edge of the lenses when the present invention is folded for transport or storage.

FIG. 6 shows a close up view of the outer edge of the lenses 12 having a connection means 22. The lenses 12 are hingedly connected 16 to the temple pieces 14. The connection means 22 has a plurality of raised areas 30 and recessed areas 32. Here, the raised and recessed areas 30, 32 are rectangular in shape. However, these areas may be a number of differing shapes, as long as the complementary areas on the opposing side of the eyeglasses 1 mirror them. Thus, the areas could all be triangles, or there could be two circles and two rectangles. The number of areas is inconsequential although it is preferable to have at least two areas to ensure a connection. When the lenses 12 are folded forwards, the connection means 22 are brought together and the raised and recessed areas 30, 32 fit into the complementary raised and recessed areas on the opposite side of the eyeglasses 1 (see FIG. 7). This prevents any up/down movement of the lenses 12. This is important because it greatly restricts the damage that can be done to the lenses 12. If one were able to shift the lenses 12 while folded and being stored/transported numerous pieces such as the hinged bridge 10 and lenses 12 themselves could crack or break.

Figure 9:
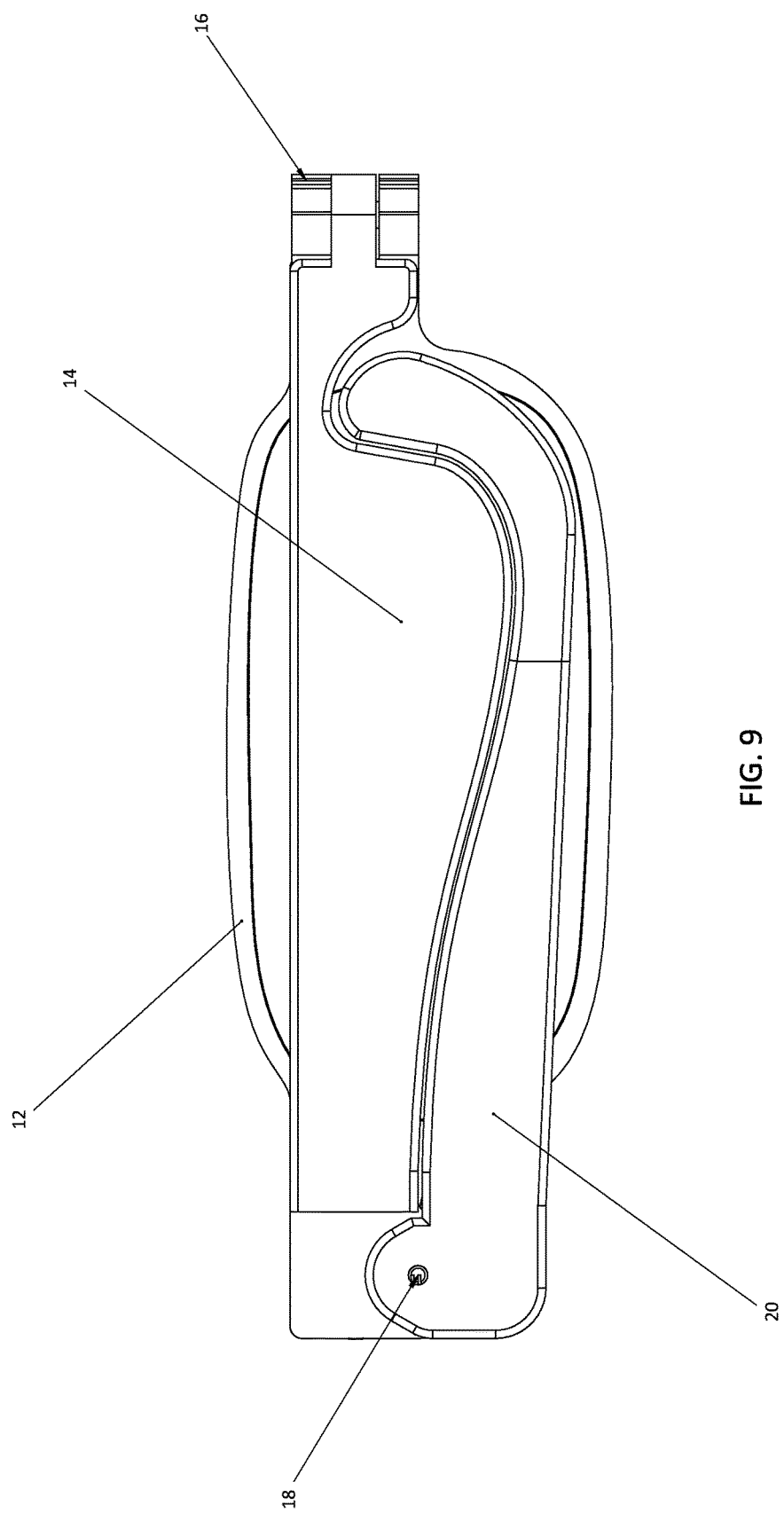
FIG. 9 is side view of a second embodiment of the present invention in a compact or storage position.

FIGS. 9-13 detail another embodiment of the present invention. In FIG. 9, there is a side view of the eyeglasses 1 in a folded or storage position. Visible is the temple piece 14 along with the rear section 20. The rear section 20 is folded or rotated towards the temple piece 14. The rear section 20 rotates about a hinged joint 18 which provides for about 180° of rotation but may be more or less depending on the exact design and specifications of the eyeglasses 1. The rear section 20 has a shape which is complementary to the temple piece 14 which, in turn, enables the temple piece 14 and rear section 20 to fold into a compact, minimalistic area.

Further, the temple piece 14 rotates about the hinged connection 16 thereby covering at least one of the lenses 12. This positioning of the temple piece 14 along the length of the lens 12 protects the lens 12 from scuffs, scrapes, cracking, and the like or any combination thereof. This is further evidenced from the top view of the same configuration in FIG. 10. Here, the temple pieces 14 can be seen flanking the lenses 12. The hinged bridge 10 enables the lenses 12 to be brought together, and the hinged connection 16 permits the temple pieces 14 to lie substantially parallel to the lenses 12.

Additionally, there is a stabilization loop 11 which provides stability to the structure. The stabilization loop 11 limits or prevents the lenses 12 from being torqued when in use. When the foldable glasses are to be stored or transported, the stabilization loop 11 is exposed thereby providing a structure for coupling the foldable glasses 1 to a secondary object such as a keychain, keychain connector, or the like or any combination thereof.

Figure 11:
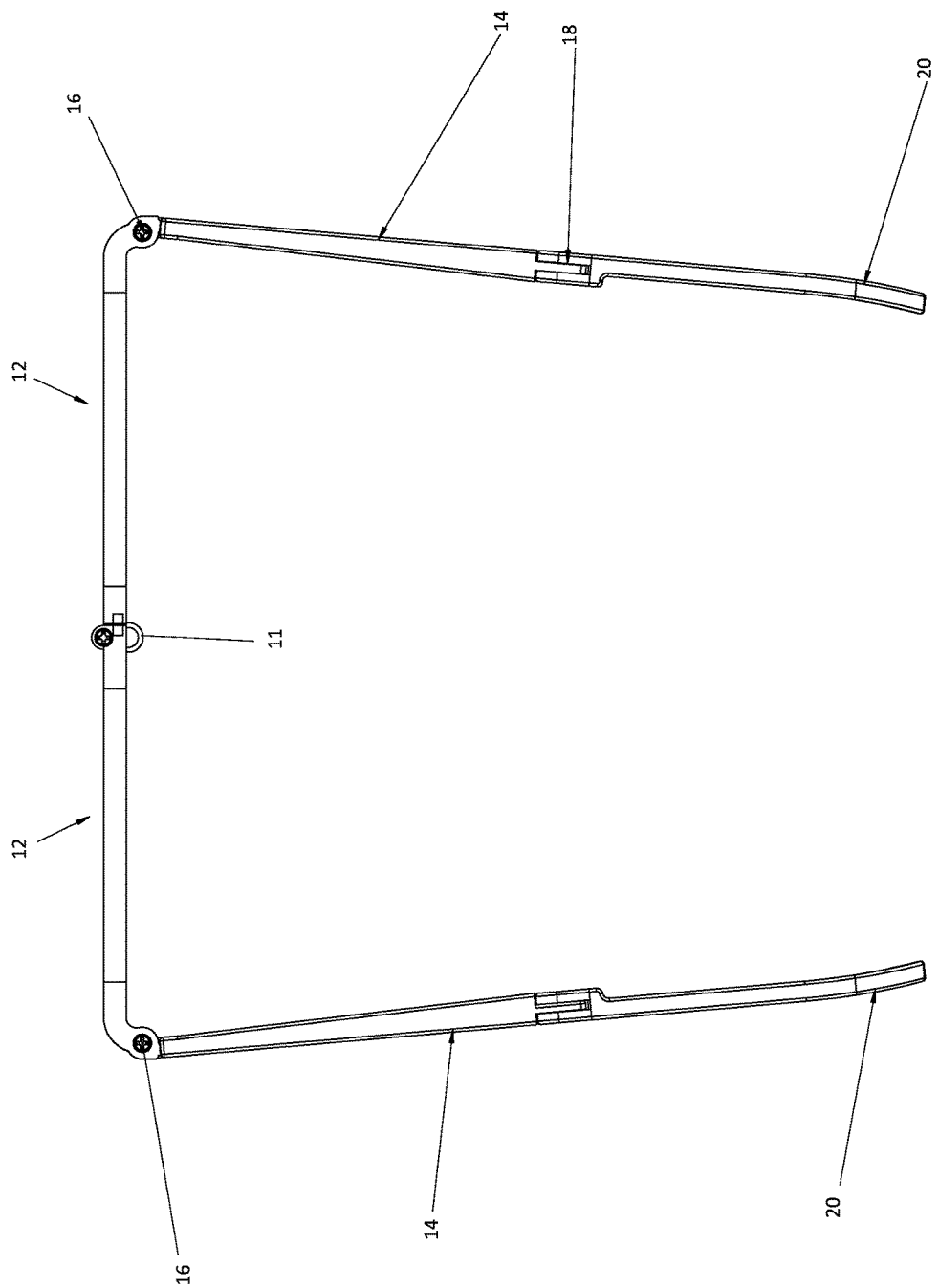
FIG. 11 is a top view of a second embodiment of the present invention unfolded and ready for use as a pair of eyeglasses.

Referring now to FIG. 11, the foldable glasses 1 have been unfolded and are ready to be worn as a pair of eyeglasses. Taken from the top, the foldable glasses 1 appear to be similar to standard eyeglasses. Here, the foldable glasses 1 have been rotated about the hinged bridge 10, hinged connection 16, and hinged joint 18. This brings the lenses 12 in the same plane as one another. The rear section 20 of the temple piece 14 provides additional length of the temple piece 14 enabling the temple piece to fit around the ear of the wearer. The stabilization loop 11 prevents uneven movement of the lenses 12.

Figure 12:
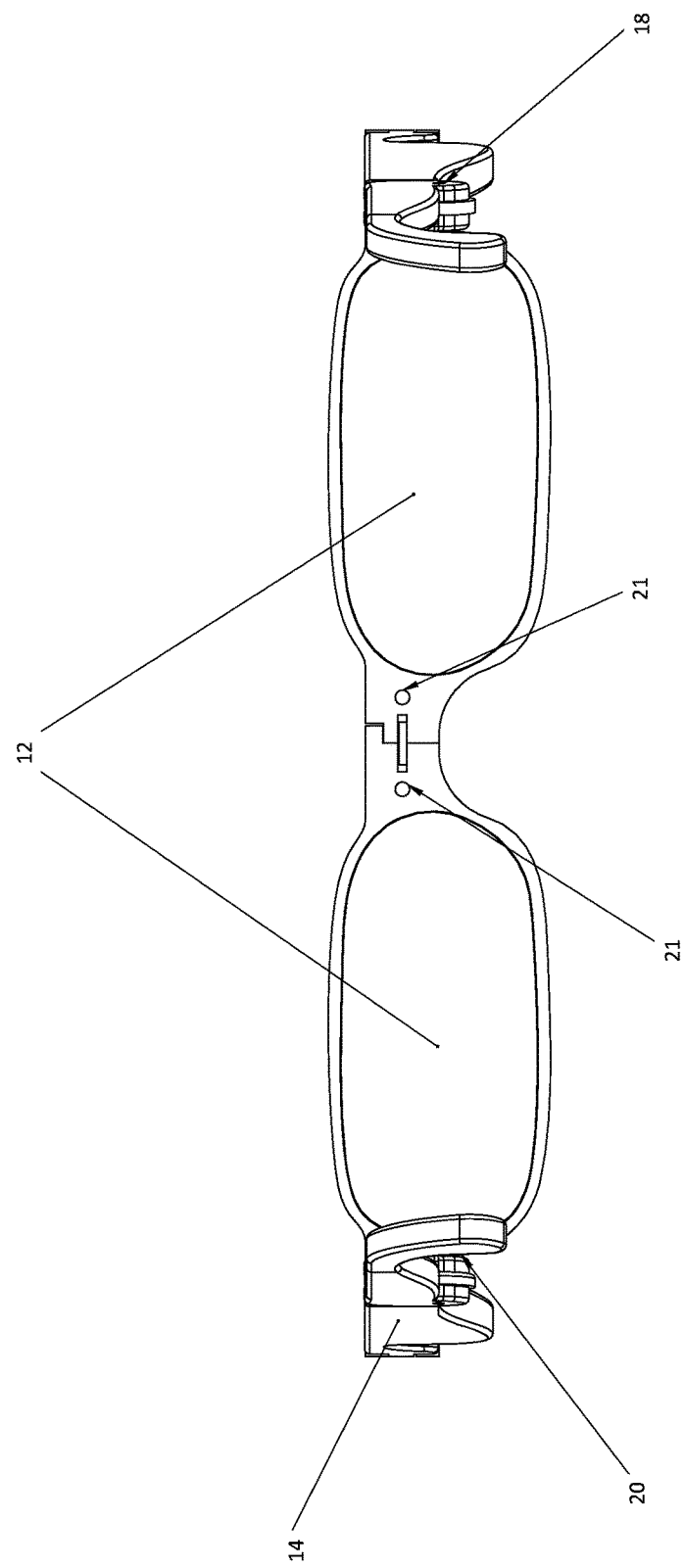
FIG. 12 is a side view taken from the rear of a second embodiment of the present invention.

In FIG. 12, the eyeglasses 1 are viewed from the rear in the same configuration as in FIG. 11. Each of the temple pieces 14 are shown generally parallel to one another with the rear sections 20 fully extended. However, the position of the temple pieces 14 may vary depending on the shape of the wearer's head. The stabilization loop 11 is shown flanked by magnets 21.

Figure 10:
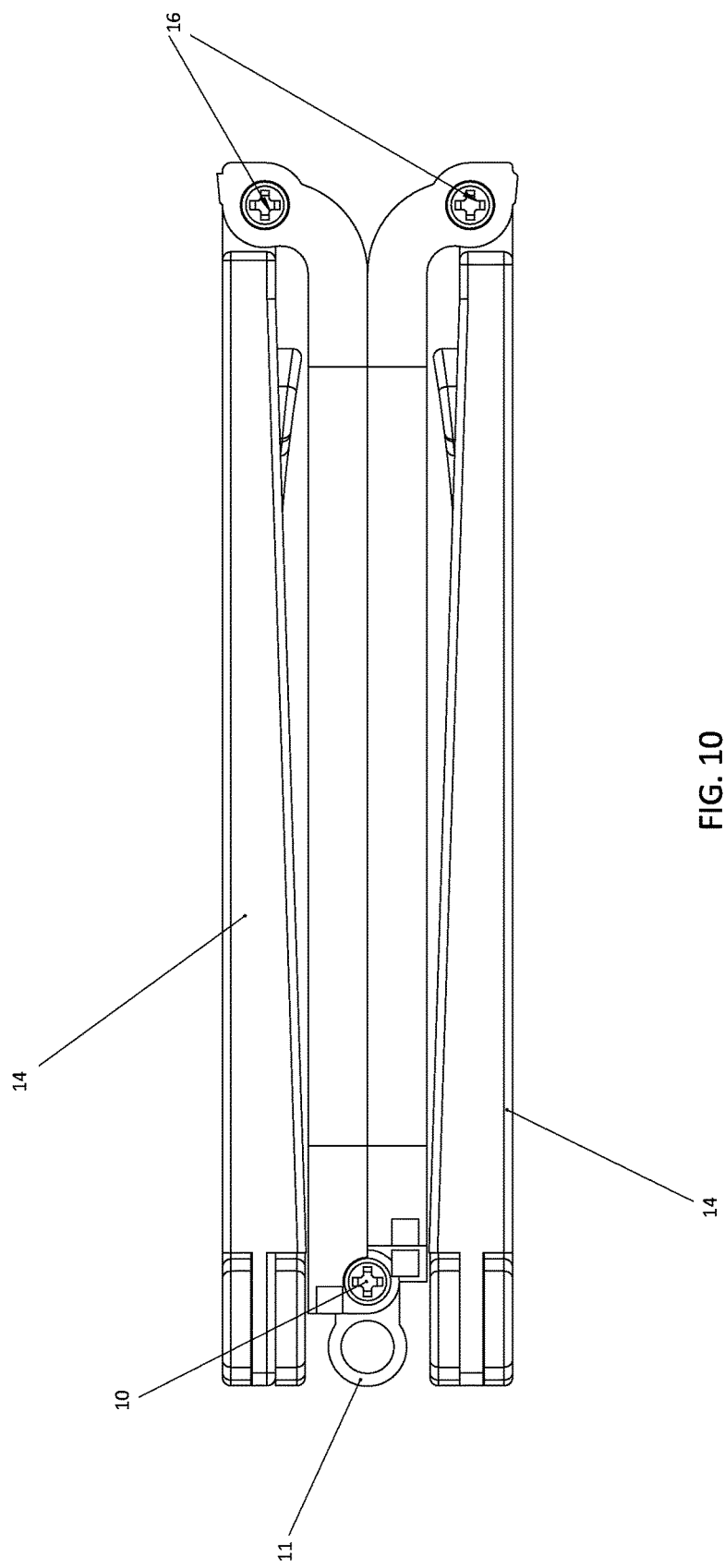
FIG. 10 is a top view of a second embodiment of the present invention in a compact or storage position.

The magnets 21 help to hold the glasses in the storage position such as demonstrated by FIGS. 9 and 10. The magnets 21 provide for magnetic attraction between the different magnets 21. The magnets 21 are positioned so that when the eyeglasses 1 are placed in the storage position (see FIGS. 9 and 10) or the magnifying position (see FIGS. 2 and 3) that such magnets 21 with opposing polarity are brought within an attraction distance to one another. This creates a magnetic attraction between the magnets 21 thereby holding the eyeglasses 1 in the desired position. The number and position of the magnets 21 may vary and may range from about 2 to about 20 in number. Preferably, the magnets 21 are positioned on each of the hinges and along the surfaces to be "joined" in the magnifying or storage position(s).

Figure 13:
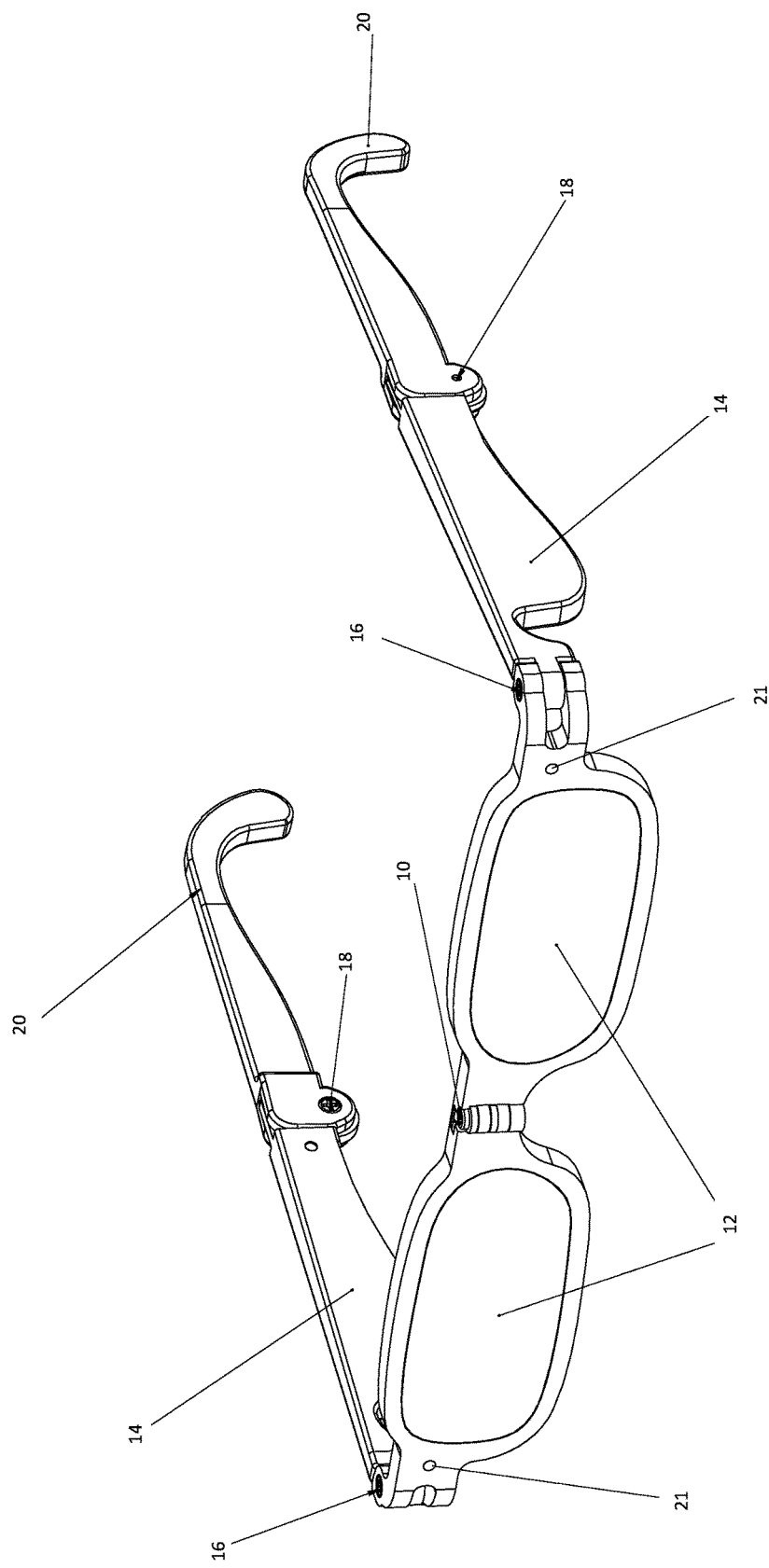
FIG. 13 is a perspective view of a second embodiment of the present invention.

Referring now to FIG. 13, there is a perspective view of the eyeglasses 1 in accordance with the embodiment described in FIGS. 9-13. The eyeglasses 1 generally have two lenses 12, a hinged bridge 10, two temple pieces 14 with each temple piece having a rear section 20, a hinged connection 16 rotatably joining the lenses 12 and the temple pieces 14, and a hinged joint 18 rotatably joining the temple pieces 14 and the rear sections 20.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A pair of foldable glasses comprising:
   two lenses surrounded by a frame, the two lenses having a first side and a second side, the first side facing outwards and the second side facing the wearer;
   a hinged bridge for connecting the lenses together and permitting the lenses to fold together either forwards or rearwards, the hinged bridge having a stabilizing loop directly attached thereto;
   two temple pieces extending from an outer edge of the frame with a hinged connection between each of the temple pieces and the outer edge of the frame enabling the two temple pieces to fold inwards or forwards, wherein the two temple pieces have a hinged joint permitting a rear section of the temple pieces to fold forwards underneath the temple pieces;
   a coupling mechanism and a complimentary coupling mechanism on a front surface of the frame,
      wherein the coupling mechanism and complimentary coupling mechanism have male and female connectors,
         wherein the coupling mechanism and the complimentary coupling mechanism are defined by two raised rectangular portions and two depressed rectangular portions arranged in a rectangular configuration having two rows and two columns,
         wherein one of the two raised rectangular portions is in each row and in each column, and
         wherein one of the two depressed rectangular portions is in each row and in each column.

2. The pair of foldable glasses of claim 1 wherein the hinged bridge is folded outwards bringing together the coupling mechanism and the complimentary coupling mechanism on the front surface of the frame forming a rigid structure and aligning the two lenses forming a magnifier.

3. A pair of foldable glasses that when folded are adapted to be held on a keychain, the foldable glasses comprising:
   two lenses surrounded by a frame, the two lenses having a first side and a second side, the first side facing outwards and the second side facing the wearer;
   a hinged bridge for connecting the lenses together and permitting the lenses to fold together either forwards or rearwards, the hinged bridge having a stabilizing loop directly attached thereto,
      wherein the stabilizing loop protrudes from the hinged bridge when the hinged bridge is in a folded configuration;
   two temple pieces extending from an outer edge of the lenses with a hinged connection between each of the temple pieces and the outer edge of the lenses enabling the two temple pieces to fold inwards or forwards, wherein the two temples piece have a hinged joint permitting a rear section of the temple pieces to fold forwards underneath the temple pieces; and
   a coupling mechanism and a complimentary coupling mechanism on a front surface of the frame,
      wherein the coupling mechanism and complimentary coupling mechanism have male and female connectors,
         wherein the coupling mechanism and the complimentary coupling mechanism are defined by two raised rectangular portions and two depressed rectangular portions arranged in a rectangular configuration having two rows and two columns,
         wherein one of the two raised rectangular portions is in each row and in each column, and
         wherein one of the two depressed rectangular portions is in each row and in each column;
   a temple connector having two flat extensions with a circular portion being attached to each of the two flat extensions, the temple connector being disposed on an outer side of each of the two temple pieces,
      wherein the outer side faces away from the wearer and the temple connector has complimentary male and female connectors,
         wherein the temple connector has a first end and a second end, and
         wherein the first end is attached to the outer side of one of the two temple pieces and the second end has the circular portion attached thereto.

4. The pair of foldable glasses of claim 3 wherein the foldable glasses are configured to be carried on a keychain attached to the stabilizing loop.

5. The pair of foldable glasses of claim 3 wherein the two temple pieces are folded forward around the coupling mechanism and complimentary coupling mechanism on the front surface of the frame thereby engaging the coupling mechanism and the complimentary coupling mechanism forming a handle.

* * * * *